(12) United States Patent
Yamamoto et al.

(10) Patent No.: US 7,518,603 B2
(45) Date of Patent: Apr. 14, 2009

(54) POWER CIRCUIT APPLYING AC VOLTAGE AND DC VOLTAGE TO RESPECTIVE TERMINALS OF A CAPACITOR, FOR OUTPUTTING AC VOLTAGE SHIFTED IN ACCORDANCE WITH THE DC VOLTAGE

(75) Inventors: Ryuji Yamamoto, Daido (JP); Kazunori Nohara, Hirakata (JP); Tomoshi Yoshida, Nishinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 567 days.

(21) Appl. No.: 10/928,777

(22) Filed: Oct. 28, 2004

(65) Prior Publication Data
US 2005/0135131 A1  Jun. 23, 2005

(30) Foreign Application Priority Data
Oct. 28, 2003 (JP) ............................. 2003-368032

(51) Int. Cl.
G09G 5/00 (2006.01)
G06F 3/038 (2006.01)
(52) U.S. Cl. ........................................ 345/211; 345/98
(58) Field of Classification Search ................. 345/211, 345/204, 89, 87, 95
See application file for complete search history.

(56) References Cited

U.S. PATENT DOCUMENTS 5,789,871 A   8/1998  Shen et al.
5,929,847 A * 7/1999  Yanagi et al. ............... 345/211
6,633,287 B1 * 10/2003 Yatabe et al. ............... 345/211
2002/0027551 A1  3/2002  Nitta et al.
2002/0190938 A1  12/2002 Yamada

FOREIGN PATENT DOCUMENTS

JP   2000-81606   3/2000

OTHER PUBLICATIONS

English Patent Abstract of 2000-81606 from esp@cenet.
U.S. Office Action issued in U.S. Appl. No. 10/976,183 mailed on Nov. 19, 2007, 14 pages.

* cited by examiner

Primary Examiner—Kevin M Nguyen
(74) Attorney, Agent, or Firm—Osha • Liang LLP

(57) ABSTRACT

A power circuit outputs and applies an AC voltage and a DC voltage to respective terminals of a capacitor, so as to obtain an AC output voltage shifted in accordance with the DC voltage component. The power circuit includes a first voltage adjuster for outputting an AC voltage, a second voltage adjuster for outputting a DC voltage, a first output terminal which outputs the AC voltage from the first voltage adjuster, and a second output terminal which outputs the DC voltage from the second voltage adjuster. The first output terminal is connected to one end of the capacitor, while the second output terminal is connected to the other end of the capacitor. The power circuit controls impedance between the first output terminal and the first voltage adjuster.

10 Claims, 4 Drawing Sheets

POWER CIRCUIT APPLYING AC VOLTAGE AND DC VOLTAGE TO RESPECTIVE TERMINALS OF A CAPACITOR, FOR OUTPUTTING AC VOLTAGE SHIFTED IN ACCORDANCE WITH THE DC VOLTAGE

CROSS-REFERENCE TO RELATED APPLICATIONS

The entire disclosure of Japanese Patent Application No. 2003-368032 including specification, claims, drawings and abstract is incorporated herein by reference in its entirety.

BACKGROUND OF THE INVENTION

1. Field of the Invention

The present invention relates to a power circuit which outputs and applies an AC voltage and a DC voltage to respective terminals of a capacitor, so as to obtain an AC output voltage shifted in accordance with the DC voltage component.

2. Description of the Related Art

In recent years, LCDs (liquid crystal displays) characterized by a flat shape and low power consumption are employed in a wide variety of forms ranging from a small-sized LCD mounted on a mobile phone to a large-sized LCD such as a wall-mounting television panel. In an LCD, voltage is applied to liquid crystal to change the state of alignment of the liquid crystal, thereby adjusting light transmittance and controlling display.

Such voltage application to liquid crystal may be performed according to an active matrix scheme using a thin film transistor (hereinafter referred to as "TFT") as disclosed in Japanese Patent Laid-Open Publication No. 2000-81606. The active matrix scheme is explained referring to FIG. 4. In an active matrix panel, gate lines 300 extending along the row direction and drain lines 400 extending along the column direction are arranged intersecting one another, defining pixel areas. Each pixel includes a TFT 500 which serves as a switching element. A pixel electrode provided separately in each pixel is connected to the source of the TFT 500. A counter electrode 900 is disposed commonly opposing the pixel electrodes formed in the individual pixels over the entire panel. Further, liquid crystal is sealed between the pixel electrodes and the counter electrode 900. Accordingly, a liquid crystal element 600 for each pixel is composed of a part of the common liquid crystal positioned between the pixel electrode of an individual pixel and the counter electrode 900. Furthermore, an auxiliary capacitor 700 is provided at a connection point between the TFT 500 and the pixel electrode by coupling with an auxiliary capacitance line 800.

According to the active matrix scheme, a gate voltage for turning on the TFTs 500 is sequentially applied to each gate line 300. When the gate voltage is applied to a gate line, all of the TFTs 500 in the corresponding row are turned on to allow electrical conduction between the drain and the source. When the TFTs 500 of one row are turned on, video signals input into the drain lines 400 corresponding to those pixels are passed through the TFTs 500 and retained in the auxiliary capacitors 700, allowing the video signals to be applied to the pixel electrodes. In this manner, each pixel electrode is supplied with a voltage in accordance with a video signal corresponding to that pixel. When such voltages are applied to the liquid crystal 600 between the pixel electrodes and the counter electrode 900 in one row, an image in accordance with the video signals can be displayed for one horizontal scan line. By sequentially repeating this process for individual horizontal scan lines, a screen display can be achieved.

In an LCD, one screen image is displayed by allowing each auxiliary capacitor 700 to retain a voltage and maintain the potential of a corresponding pixel electrode, so as to continue applying the voltage to the liquid crystal 600 during one field.

Furthermore, an alternating current drive method has been proposed in recent years. According to this method, polarity of a video signal and polarity of the voltage of the counter electrode 900 are reversed every scan line.

FIG. 5 shows an example of a conventional power circuit for the alternating current drive method. This power circuit applies an AC voltage and a DC voltage to respective terminals of a capacitor, and outputs an AC voltage shifted in accordance with the DC voltage component for supplying to the counter electrode 900. The power circuit 110 of FIG. 5 comprises a voltage adjuster 11 for outputting an AC voltage, and a voltage adjuster 21 for outputting a DC voltage. The voltage adjuster 11 employs a switch element to perform switching between DC voltage Vw and the ground level (0V), so as to produce an AC voltage (pulse voltage). Further, a capacitor 200 is used to eliminate DC components, and the obtained AC voltage is supplied to output Out. Meanwhile, the DC voltage component V2 is output from the voltage adjuster 21 and supplied via a resistor 40 to the output Out. Using this arrangement, the AC voltage supplied by the voltage adjuster 11 can be shifted by the DC voltage supplied by the voltage adjuster 12, and the shifted AC voltage can be obtained at the output Out. The resistor 40 is provided to prevent the AC voltage output at Out from influencing the voltage adjuster 21.

When employing the above-described conventional power circuit to apply an AC voltage to the counter electrode of an LCD, it is necessary to adjust the frequency of the AC voltage to match the low-frequency switching timing of the horizontal scan lines of the LCD, which is typically about several ten Hz. For this reason, the capacitor connected to the power circuit must have relatively large capacitance in the order of several ten µF. Further, it is necessary to use a resistor having relatively large resistance in the order of several hundred kΩ as the resistor connected to the voltage adjuster 21. Accordingly, when turning off power of the conventional power circuit, a relatively long time is required before charges in the capacitor are completely discharged, therefore disadvantageously requiring a considerable time before the voltage applied to the counter electrode is converged to 0V.

Assuming that the internal resistance within the voltage adjuster 11 for outputting AC voltage is 0Ω, the capacitor value is 47 µF, and the resistor value is 100 kΩ, the conventional power circuit would require approximately two seconds before the capacitor is completely discharged by the voltage adjuster 21 to achieve 0V.

SUMMARY OF THE INVENTION

The present invention provides a power circuit comprising a first voltage adjuster for outputting an AC voltage, a second voltage adjuster for outputting a DC voltage, a first output terminal which outputs the AC voltage from the first voltage adjuster, and a second output terminal which outputs the DC voltage from the second voltage adjuster. The first output terminal is connected to one end of the capacitor, while the second output terminal is connected to the other end of the capacitor. At a point of turning off power of the power circuit, impedance between the first output terminal and the first voltage adjuster is controlled such that the impedance level becomes higher compared to that before the point of turning off power. Further, a potential different from the DC voltage output from the second voltage adjuster is supplied to the second output terminal. With this arrangement, the power circuit can effectively discharge the capacitor at the time of turning off power.

DESCRIPTION OF THE PREFERRED EMBODIMENT

Figure 1:
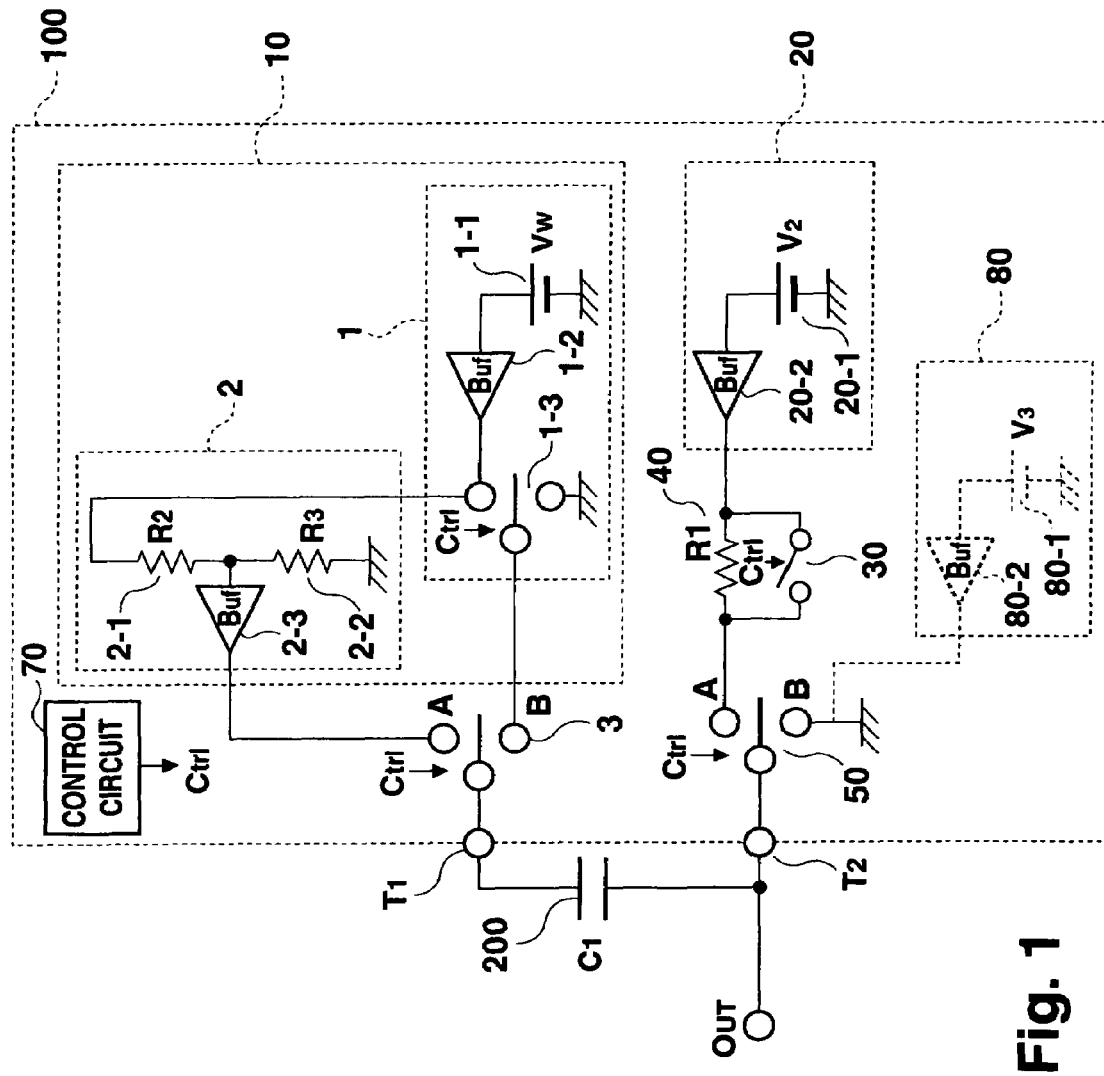
FIG. 1 is a circuit diagram showing a power circuit according to an embodiment of the present invention.

The preferred embodiment of the present invention is next described referring to the drawings. FIG. 1 shows the structure of a power circuit according to an embodiment of the present invention. The power circuit 100 shown in FIG. 1 comprises a voltage adjuster 10 for outputting an AC voltage, and a voltage adjuster 20 for outputting a DC voltage. The voltage adjuster 10 comprises a signal generator 1 and a voltage divider 2.

The signal generator 1 includes a power source 1-1 for generating standard voltage Vw. The output from the power source 1-1 is stabilized by a buffer amplifier 1-2. The output from the buffer amplifier 1-2 is input into one input terminal of a switch 1-3. The other input terminal of the switch 1-3 is grounded. When the switch 1-3 performs switching, the signal generator 1 outputs an AC voltage (pulse voltage) which alternates between the ground level (0V) and the standard voltage Vw. The voltage divider 2 comprises a serial connection of a resistor 2-1 having resistance value R2 and a resistor 2-2 having resistance value R3. One end of the serially-connected structure receives the output from the buffer amplifier 1-2, while the other end is grounded. A divided voltage obtained at the connection point between the two resistors 2-1 and 2-2 is output via a buffer amplifier 2-3. While it is possible to adjust the output from the voltage divider 2 by controlling the values R2 and R3, it is preferable to configure such that R2=R3 holds true, thereby allowing the output to equal (½) Vw. The AC voltage output from the signal generator 1 and the output from the voltage divider 2 are input into a switch 3. Accordingly, by switching the switch 3, either of the AC voltage output from the signal generator 1 or the DC output from the voltage divider 2 can be selectively output. An output terminal of the switch 3 is connected to one output terminal T1 of the power circuit 100, which is in turn connected to a first terminal of an externally-provided capacitor 200.

The voltage adjuster 20 is composed of a power source 20-1 for outputting standard voltage V2, and a buffer amplifier 20-2 for stabilizing the output from the power source 20-1. With this arrangement, the voltage adjuster 20 constantly outputs a DC voltage having the voltage value of V2. The output of the voltage adjuster 20 is connected to one terminal of a parallel connection of a resistor 40 and a switch 30. The other terminal of the parallel connection structure is connected via a switch 50 to an output terminal T2 of the power circuit 100, which is in turn connected to a second terminal of the externally-provided capacitor 200. The switch 50 includes two input terminals, which are terminal A connected to the parallel connection structure of the resistor 40 and the switch 30, and terminal B connected to ground. The output terminal of the switch 50 is connected to the output terminal T2. According to this arrangement, when the switch 30 is turned on while the switch 50 is connected to terminal A, the output from the voltage adjuster 20 is applied without any change to the second terminal of the capacitor 200. Further, by turning off the switch 30 while the switch 50 is connected to terminal A, the output from the voltage adjuster 20 is supplied to the second terminal of the capacitor 200 via the resistor 40. In the present embodiment, the power circuit is integrated into one integrated circuit, while the capacitor 200 is arranged externally. Moreover, a signal obtained from the T2 side of the capacitor 200 is supplied to an LCD panel as a signal for AC-driving the counter electrode.

In the power circuit 100 of the present embodiment, the switches are controlled as described below in order to optimize the voltage supplied to the LCD panel. While switch control is performed in the present embodiment based on a signal supplied from an external device such as a microcomputer, a control circuit may alternatively be integrated in the power circuit.

When turning on power of the system, the switch 50 is always set to select terminal A, and this setting will not be repeated in the following description. For a predetermined duration after turning on power of the system, the switch 30 is set to ON, and the switch 3 is connected to A to select the voltage divider 2. At this point, the switch 1-3 may be in an arbitrary state. By turning on the switch 30, the DC voltage V2 output from the voltage adjuster 20 is allowed to bypass the resistor 40 and be output from the output terminal T2. Further, by connecting the switch 3 to A, the output from the voltage divider 2 is output from the output terminal T1. It should be noted that the output voltage from the voltage divider 2 is equal to Vw·(R3/(R2+R3)). By allowing R2=R3 to hold true, this voltage is set to a value corresponding to the average voltage of one cycle of the AC voltage (pulse voltage), which is (½)Vw assuming that the duty ratio is 50%. Accordingly, at this point, the DC voltage V2 and the DC voltage Vw·(R3/(R2+R3)) are applied to the respective terminals of the capacitor 200. The capacitor 200 is thereby charged with voltage Vw·(R3/(R2+R3))−V2.

After the predetermined duration required for fully charging the capacitor 200 has passed, the switch 30 is disconnected, and the switch 3 is connected to B. Further, the switch 1-3 is switched at a predetermined frequency such that an AC voltage (pulse voltage) having amplitude Vw is output from the signal generator 1. Consequently, the DC voltage V2 is output via the resistor 40 to the output terminal T2, while the AC voltage having amplitude Vw is output from the output terminal T1, allowing these voltages to be applied to the respective terminals of the capacitor 200. Within the capacitor 200, the AC voltage supplied from the output terminal T1 is conducted to the other terminal of the capacitor 200. As a result, an AC output voltage (having peak-to-peak voltage Vw) which is DC-shifted so as to oscillate with the center voltage being the DC voltage V2 can be obtained at the terminal Out connected to an input terminal of the LCD panel.

As described above, at the time of turning on power of the power circuit of the present embodiment, the average voltage of one cycle of the AC voltage is applied to the capacitor 200 from the terminal T1, from which the AC voltage is to be later supplied. This initially applied voltage serves as a DC offset voltage on the T1 side of the capacitor 200 when the AC voltage is supplied. As a result, in comparison to a conventional power circuit in which an AC voltage is applied from the beginning, the power circuit of the present embodiment allows the AC voltage on the T1 side of the capacitor 200 to be stabilized more quickly at the point when the AC voltage is applied. In addition, at the time of turning on power, the DC voltage V2 output from the voltage adjuster 20 is allowed to bypass the resistor 40 and be supplied directly to the other side of the capacitor 200 via the output terminal T2. According to this arrangement, voltage on the T2 side of the capacitor 200 can be stabilized quickly. In this manner, in the power circuit of the present embodiment, the charge state of the capacitor 200 is rapidly stabilized, and, when an AC voltage is subsequently applied, an AC output voltage that is DC-shifted so as to oscillate with the center voltage being the DC voltage V2 can be obtained stably. At the time of turning on power, the output voltage can thereby be converged quickly to a steady state.

Figure 2:
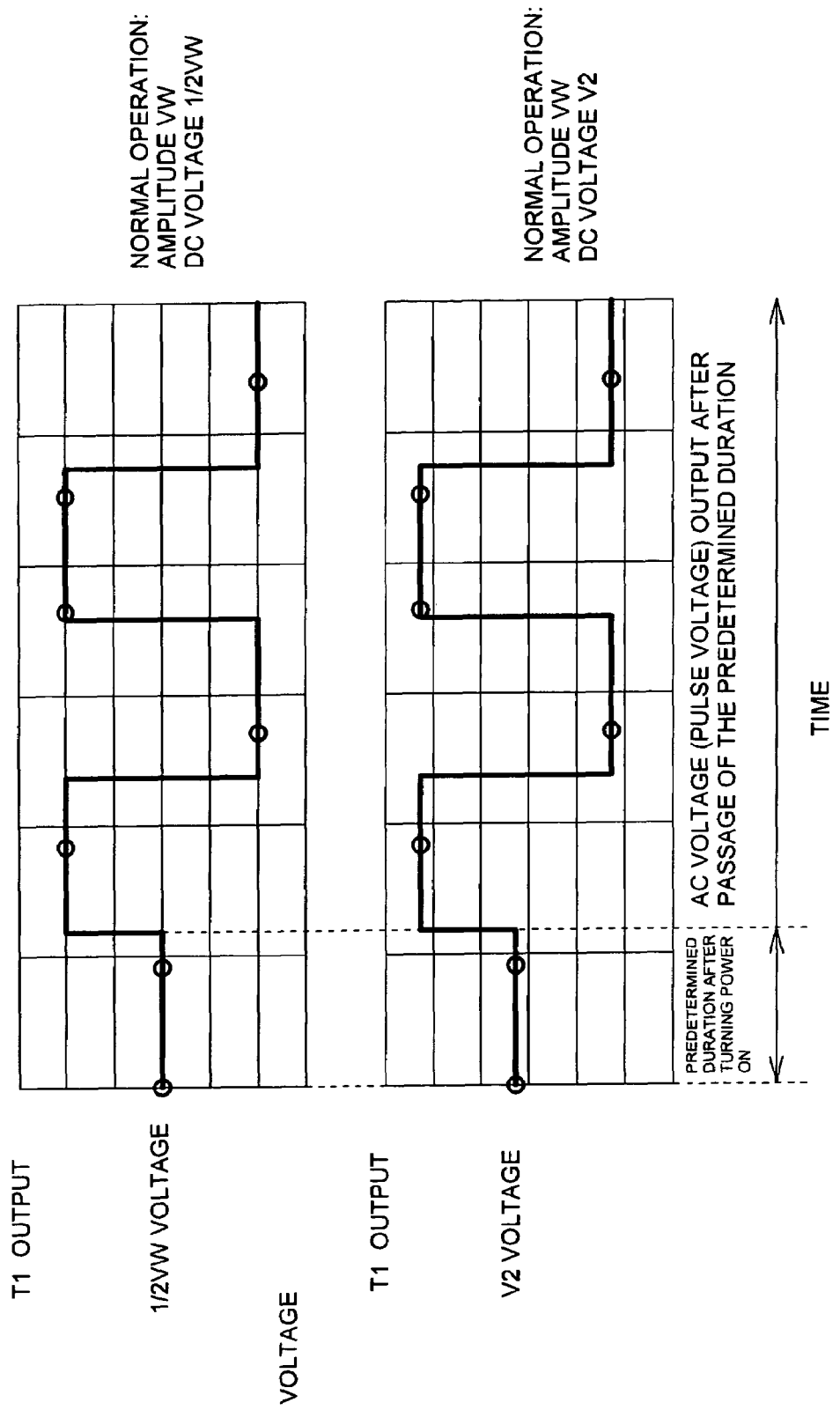
FIG. 2 shows output waveforms generated when turning on power of the power circuit according to an embodiment of the present invention.

FIG. 2 shows waveforms generated when power is turned on from a power save mode (during which the power circuit of the present embodiment is not operated), and the power circuit is subsequently operated to output the AC voltage. In FIG. 2, the upper graph illustrates changes in voltage at the output terminal T1, while the lower graph illustrates changes in voltage at the output terminal T2. The voltage output from the terminal T1 is a pulse voltage which oscillates with the center voltage being (½)Vw, and the voltage output from the terminal T2 is a pulse voltage which oscillates with the center voltage being V2. As can be seen, stable outputs can be obtained from immediately after passage of the predetermined duration subsequent to turning on power.

In the above example, the duty ratio of the AC voltage is 50%, and the output from the voltage divider 2 is set to (½)Vw. When an AC voltage having a different duty ratio is employed, the average voltage of one cycle of the pulse voltage may be correspondingly used as the output from the voltage divider 2. It should be noted that the center voltage of an AC voltage is the average voltage of one cycle of the AC voltage. Further, the predetermined duration after turning on power may be set to an appropriate period of time in accordance with the system design specification.

As noted above, during normal operation of the power circuit, the switch 50 is set to select terminal A. In this state, the output terminal T1 outputs an AC voltage having the center voltage of (½)Vw, and the output terminal T2 outputs an AC voltage having the center voltage of V2.

When transferring from the normal operation mode to the power save mode, the power source of the LCD panel is turned off. However, because the overall LCD panel acts as a large capacitor, the voltage value of the LCD panel does not easily drop to the ground level. When turning off power, it is desirable to quickly drop the voltage of the counter electrode 900 to the ground level. According to the power circuit of the present embodiment, when turning off power, the switch 50 is set to select terminal B so as to connect the output terminal T2 to the ground. While this may be effective in changing the voltage of the counter electrode 900 of the LCD panel to ground potential, the capacitor 200 having large capacitance is connected between the output terminals T1 and T2. Accordingly, voltage at the output terminal T2 is influenced by the potential of the output terminal T1 and the state of charge of the capacitor. With this configuration, ground potential cannot be attained at the output terminal T2 until charges in the capacitor 200 are discharged. As such, by simply connecting the switch 50 to ground, it would require a long period of time to achieve ground potential at the output terminal T2.

To solve the above problem, the T1 side of the capacitor 200 is disconnected when turning off power in the power circuit of the present embodiment. More specifically, the switch 3 is disconnected from both terminals A and B. With this configuration, voltage at the output terminal T2 can be adjusted while maintaining the state of charge of the capacitor 200, thereby allowing to instantly achieve ground potential at the output terminal T2.

As described above, when turning off power in the power circuit of the present embodiment, the switch 50 is set to select the ground so as to ground the terminal T2 connected to one end of the capacitor 200, while the switch 3 is disconnected to electrically disconnect the other end of the capacitor 200. As a result, the voltage level of the output terminal T2 can be speedily dropped to the ground level, thereby in turn allowing to quickly set the voltage of the counter electrode 900 of the LCD panel to ground potential.

Figure 3:
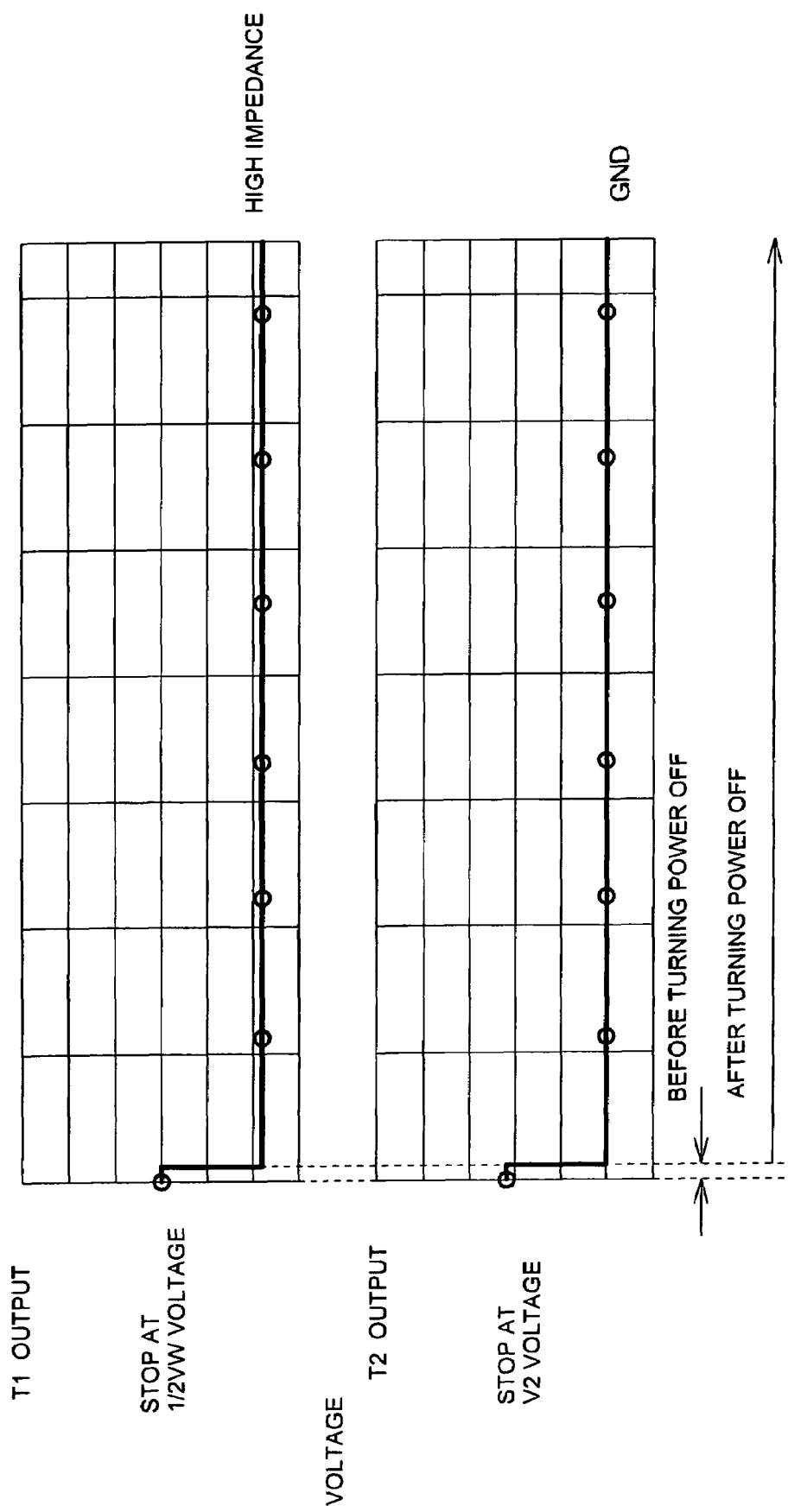
FIG. 3 shows output waveforms generated when turning off power of the power circuit according to an embodiment of the present invention.
Figure 4:
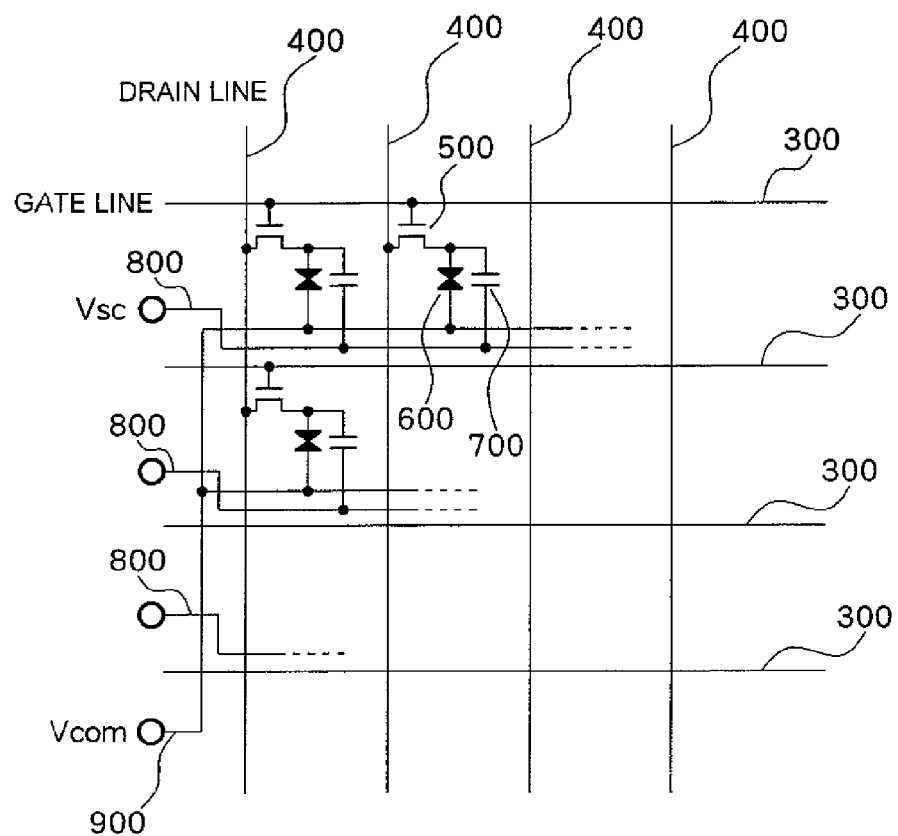
FIG. 4 is an equivalent circuit diagram showing an LCD configured with an active matrix structure.
Figure 5:
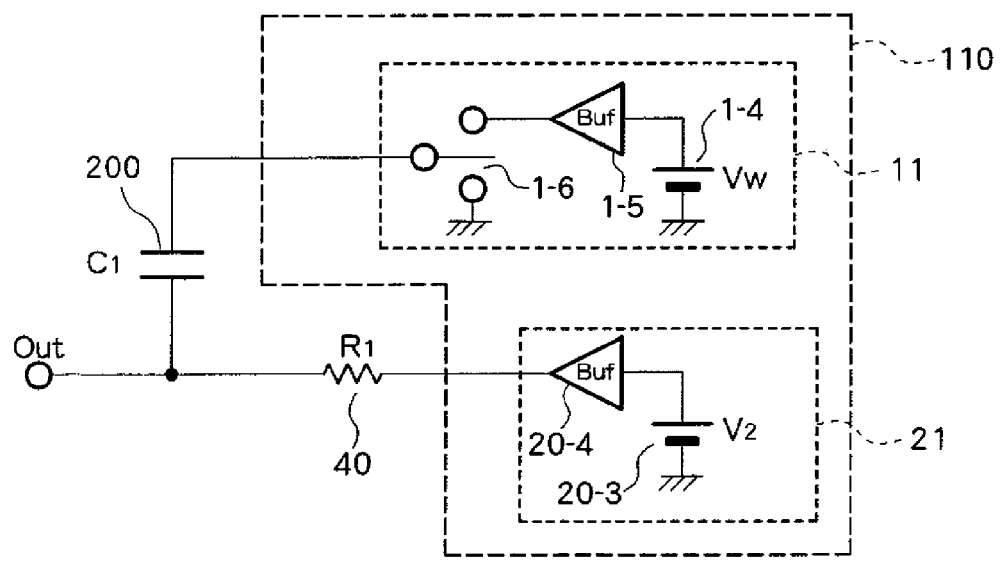
FIG. 5 is a circuit diagram showing a conventional power circuit.

FIG. 3 illustrates changes in voltage at the output terminals T1 and T2 at the time of turning off power. As shown, the voltage at the output terminal T2 is rapidly dropped to ground potential, while the voltage at the output terminal T1 is set to a voltage lower than the ground level by value V2−(½)Vw corresponding to the charge voltage in the capacitor 200. In this manner, the output voltage of the power circuit of the present embodiment is quickly dropped to ground potential when the power is turned off, thereby enabling rapid drop of the voltage of the counter electrode 900 of the LCD panel to ground potential.

In the power circuit of the present embodiment, instead of being connected to ground, the switch 50 may alternatively be connected to a third voltage adjuster 80 for outputting a predetermined DC voltage, as shown by a broken line in FIG. 1. With this arrangement, at the time of turning off power, the output voltage from the power circuit can be converged quickly to the predetermined voltage. The predetermined voltage may be employed to attain a standby state in the power save mode, for example. Furthermore, by setting the voltage output from the third voltage adjuster 80 to 0V, a result identical to that achieved when the switch 50 is connected to the ground can be obtained.

As described above, because the power circuit of the present embodiment outputs the AC voltage after stabilizing DC voltages at the respective terminals of the capacitor, the AC output voltage (having amplitude Vw) shifted in accordance with the DC voltage component V2 can be rapidly converged to a steady state. While the above description refers to an example in which the power circuit is used to apply voltage to a counter electrode of an AC-driven TFT-LCD, a main feature of the present invention is that rapid convergence to a predetermined potential can be achieved when turning off power of a circuit for shifting an AC voltage by a DC voltage component. The power circuit may therefore be employed for other uses without deviating from the scope of the present invention.

What is claimed is:

1. A power circuit, wherein the power circuit outputs and applies an AC voltage and a DC voltage to respective terminals of a capacitor, so as to obtain an AC output voltage shifted in accordance with the DC voltage component, the power circuit comprising:

a first voltage adjuster for outputting an AC voltage;

a second voltage adjuster for outputting a DC voltage;

a first output terminal which is connected to one end of the capacitor and outputs the AC voltage supplied from the first voltage adjuster;

a second output terminal which is connected to the other end of the capacitor and outputs the DC voltage supplied from the second voltage adjuster;

a first switch for controlling connection between the first output terminal and the first voltage adjuster so as to connect the first output terminal and the first voltage adjuster or disconnect the first output terminal and the first voltage adjuster;

a second switch for connecting the second terminal to the second voltage adjuster or a power source whose potential is different from the DC voltage output from the second voltage adjuster; wherein, the first switch is disconnected from the first voltage adjuster so as to set the one end of the capacitor to an electrically open state, and the second switch is connected to the power source so as to supply the potential from the power source to the other end of the capacitor when power of the power circuit is turn off.

2. The power circuit as defined in claim 1, wherein the circuit for supplying to the second output terminal a potential different from the DC voltage output from the second voltage adjuster comprises:

a resistor connected to the second voltage adjuster; and a first switch coupled to the second output terminal, the resistor, and ground, which connects between ground and the second output terminal at a point of turning off power of the power circuit.

3. The power circuit as defined in claim 2, further comprising a control circuit for controlling the first switch.

4. The power circuit as defined in claim 1, further comprising:

a resistor connected to the second voltage adjuster;

a third voltage adjuster for outputting a potential different from that of the second voltage adjuster; and a second switch coupled to the second output terminal, the resistor, and the third voltage adjuster, which connects between the third voltage adjuster and the second output terminal at a point of turning off power of the power circuit.

5. The power circuit as defined in claim 4, wherein the potential output from the third voltage adjuster is 0V.

6. The power circuit as defined in claim 4, further comprising a control circuit for controlling the second switch.

7. The power circuit as defined in claim 1, further comprising:

a third switch coupled between the first output terminal and the first voltage adjuster, which is disconnected at a point of turning off power of the power circuit so as to control impedance between the first output terminal and the first voltage adjuster to a level higher than the impedance level before the point of turning off power.

8. The power circuit as defined in claim 7, further comprising a control circuit for controlling the third switch.

9. The power circuit as defined in claim 1, wherein the AC voltage is a rectangular wave voltage.

10. The power circuit as defined in claim 1, wherein the power circuit is used to drive a TFT-LCD.

\* \* \* \* \*